Patented Nov. 19, 1940

2,221,804

UNITED STATES PATENT OFFICE 2,221,804

CATALYTIC HYDROGENATION OF AROMATIC COMPOUNDS CONTAINING AN OXYGEN-SULPHUR GROUP

Wilbur A. Lazier, New Castle County, and Frank K. Signaigo, Wilmington, Del., assignors to E. I. du Pont de Nemours & Company, Wilmington, Del., a corporation of Delaware No Drawing. Application August 11, 1939, Serial No. 289,582

12 Claims. (Cl. 260—609)

This invention relates to catalytic hydrogenation and more particularly to the preparation of thiophenols and hydrocarbons by the catalytic hydrogenation of aromatic sulphoacids and their derivatives.

Thiophenols have in the past been made by several different types of non-catalytic reactions, including the reaction of $P_2S_5$ upon the phenols; by distilling sodium benzene sulphonate with potassium sulphhydrate; from phenyldithiocarbonic ester; and by reacting phenyl magnesium bromide with sulphur and then decomposing the compound formed with acid. These are a few typical methods; however, none of these methods is practical for commercial practice because of high reagent consumption, difficulties in isolating the desired products from the reaction mixtures, poor or indifferent yields, etc.

This invention has as its object the preparation of thiophenols by a new and improved method. Another object is the formation of hydrocarbons from aromatic sulphoacids by a simple process that will eliminate the sulphoacid group. Another object is to provide a simple, practical method for preparing thiophenols from readily accessible materials. Other objects will be apparent from the reading of the following description of the invention.

These objects are accomplished by the following invention which comprises reacting an organic compound containing an aromatic nucleus attached to a sulphonic or sulphinic acid group or a derivative thereof, such as a salt, ester, amid, anhydride or acid halide, with hydrogen in the presence of a sulphactive hydrogenation catalyst.

It has been discovered that when an aromatic sulphoacid or a derivative of such an acid is heated with hydrogen at superatmospheric pressure in the presence of a sulphactive hydrogenation catalyst such as a base metal sulphide catalyst, the sulphoacid or derivative undergoes reduction. The end product of this reduction is the corresponding aromatic hydrocarbon having a hydrogen atom in place of the original sulphoacid group, the sulphur atom in the original compound having been reduced to hydrogen sulphide. The minimum temperature at which the aromatic sulphoacids or derivatives undergo reduction varies depending upon the particular compound and we have further found that in the case of certain of these sulphoacid derivatives it is possible to control the reduction so that instead of the normal end product (i. e., the hydrocarbon) the corresponding thiophenol is produced. This is accomplished by carrying out the catalytic hydrogenation at or near the minimum temperature needed for reaction. In some cases it is desirable to interrupt the reaction before it is completed.

The exact manner of practicing this invention will vary depending upon the particular compound processed and the product desired as shown by the following specific examples.

Example I

Into a small high-pressure autoclave there are charged 70 g. of p-toluenesulphonanilide, 100 g. of decalin and 20 g. of a sulphactive catalyst prepared by treating a methanol suspension of finely divided pyrophoric cobalt with hydrogen sulphide. Hydrogen is then forced into the autoclave to a pressure of 2000 lbs. per sq. in. and the autoclave heated to a temperature of 275° C. The contents of the autoclave are agitated by shaking the autoclave in a mechanical shaker. After 3 to 4 hours the autoclave is cooled and the contents filtered to remove the catalyst. Nitrogen is bubbled through the solution to remove the hydrogen sulphide formed and an aliquot is titrated with standard iodine solution. The amount of iodine absorbed indicates that only traces of thiocresol have been formed. By distillation, there is obtained 23 g. of toluene and a higher boiling fraction consisting of a mixture of aniline and the decalin solvent.

Example II

The above experiment is repeated using the same reactants and same conditions except that the autoclave is heated to a temperature of only 250° C. After 6 hours the pressure has dropped from 3000 lbs. per sq. in. to 1100 lbs. per sq. in. The autoclave is cooled and the contents filtered to remove the catalyst. The product is then distilled. The main portion of the liquid product boils at 70° to 80° C. at 20 mm. and consists of the solvent decalin, together with the aniline and p-thiocresol produced. Iodine titration of an aliquot indicates the yield of p-thiocresol to be 35% of the theoretical. The p-thiocresol is separated from the other components by treating the mixture with a saturated solution of lead acetate. The yellow insoluble lead salt of p-thiocresol is then separated by filtration. The p-thiocresol may then be isolated in pure form by treating the lead salt with dilute acid and filtering. The product is a white solid melting at 43° C.

Example III

A small shaking autoclave is charged with 75 g. of beta-naphthalenesulphonanilide, 150 g. of ethanol and 15 g. of cobalt sulphide catalyst prepared as in Example I. Hydrogen is forced into the autoclave to a pressure of 3000 lbs. per sq. in. and the autoclave heated to a temperature of 250° C. After 4 hours the pressure has dropped 1700 lbs. per sq. in. The autoclave is cooled and the ethanol solution of products is filtered to remove the catalyst. Considerable hydrogen sulphide is present. The solution is boiled to remove the hydrogen sulphide and, on cooling, there is obtained 50 g. of unconverted beta-naphthalenesulphonanilide. Titration of the solution with standard iodine indicates that practically no thionaphthol is formed. On distillation there is obtained naphthalene and aniline.

Example IV

The above experiment is repeated using the same quantities of reactants and same conditions except that the autoclave is heated to a temperature of only 225° C. After 5 hours heating, the pressure has fallen 1700 lbs. per sq. in. The autoclave is cooled and the solution filtered to remove the catalyst, and then boiled to drive off the hydrogen sulphide formed. Titration of the solution with standard iodine indicates the conversion of thio-beta-naphthol to be 15%. In addition to unconverted beta-naphthalenesulphonanilide, there is also obtained aniline and naphthalene. The thio-beta-naphthol may be isolated from the other products by way of the insoluble lead salt.

Example V

One hundred grams of sodium p-toluenesulphinate and 100 g. of water are charged into a small high-pressure autoclave, together with 15 g. of a cobalt polysulphide catalyst prepared by precipitating cobalt chloride solution with sodium polysulphide. Hydrogen is forced into the autoclave to a pressure of 2500 lbs. per sq. in. and the autoclave heated at a temperature of 175° C. for 6 hours. After cooling the autoclave, the solution of products is filtered to remove the catalyst and boiled to drive off hydrogen sulphide formed. The solution is then acidified with dilute sulphuric acid and the white solid precipitate is separated by filtration and purified by recrystallization from ethanol. In this manner there is obtained 29 g. of pure p-thiocresol, M. P. 43° C. This corresponds to a yield of 51% of the theoretical.

Example VI

Twenty-five grams of beta-naphthalenesulphonic acid, 60 g. of water, and 20 g. of a cobalt sulphomolybdate catalyst are charged into a small copper-lined autoclave and hydrogen is forced in to a pressure of 2500 lbs. per sq. in. The autoclave is heated to 280° C. for one hour. After cooling the solution is filtered. The insoluble material, consisting of catalyst and naphthalene, is then washed with alcohol to dissolve out the naphthalene which may be obtained by evaporating the alcoholic wash.

Example VII

Into a small high-pressure autoclave there are charged 75 g. of p-toluenesulphonamide, 150 g. of ethanol, and 15 g. of cobalt sulphide catalyst prepared as in Example I. Hydrogen is then admitted to the autoclave to a pressure of 2500 lbs. per sq. in. and the autoclave heated to 275° C. for 2 hours and then the temperature raised to 300° C. After 3 more hours the autoclave is cooled and the solution filtered to separate the catalyst. After removal of the hydrogen sulphide and ammonia formed, titration of an aliquot of the solution with standard iodine indicates that only traces of p-thiocresol are formed. On cooling the solution, unconverted p-toluenesulphonamide separates in the form of white crystals. These are filtered off and the filtrate is distilled to separate the ethanol solvent from the toluene produced.

When the experiment is repeated, except that p-toluene-sulphonethylamide and p-toluenesulphondimethylamide are substituted for the p-toluenesulphonamide above, there are obtained, in addition to some of the unconverted amide, toluene, hydrogen sulphide, and the corresponding amines in a manner strictly analogous to the results obtained above.

In the foregoing examples certain specific sulphoacids and derivatives have been disclosed for purpose of illustration. The invention is not limited to these particular materials but includes all aromatic compounds containing a sulphur-oxygen group in which the sulphur atom is directly attached to the aromatic group, said compounds being characterized by being stable with respect to thermal decomposition at the hydrogenation temperature. By the term "aromatic sulphoacids" there is meant to be included not only the sulphonic acids of aromatic hydrocarbons which may be considered as derived from $SO_3$ but also the aromatic sulphinic acids which are derived from $SO_2$, these compounds being characterized by having the sulphur atom directly linked to a carbon atom in the aromatic nucleus. The aromatic nuclei of the compounds falling within the scope of this invention may be those of the simple aromatic hydrocarbons such as benzene, toluene, xylene, mesitylene, etc., or the polynuclear aromatic hydrocarbons such as naphthalene, anthracene, and the like. In addition to the free acids, derivatives such as salts, amides, substituted amides, esters, anhydrides and acid halides may be used. Additional examples of compounds in these classes are the arylsulphinates such as sodium benzene sulphinate and aluminum naphthalenesulphinate; arylsulphonamides such as benzenesulphonanilide, mesitylenesulphonanilide and the like. In addition to the sulphoacid group, the aromatic ring may also be substituted with other functional groups such as halogen, amino, hydroxyl, etc.

Although the above examples indicate certain definite conditions of temperature, pressure, concentration, duration of reaction, catalyst, etc., it is to be understood that these values may be varied somewhat within the scope of this invention since the conditions of each experiment are determined by the particular compound treated, the quantity employed, and the catalyst used. In general, the processes of this invention are operable at temperatures ranging from 150° to 350° C. and at pressures ranging from atmospheric to a maximum determined by the practical limitations of the reaction vessel. Usually, however, it is preferable to carry out the reaction at a temperature within the range of 175° to 300° C. and at the lowest possible temperature, when it is desired to obtain thiophenols as the principal products. Higher temperatures are especially suited for conversion of sulphoacid derivatives to the parent hydrocarbons. The preferred pressure range is 1000 to 4000 lbs. per sq. in.

The proportion of catalyst employed may be varied considerably. In general, an amount of catalyst is used that will bring about reaction at a suitable rate. The type of catalyst used may likewise be varied considerably but in general the sulphides or polysulphides of the common hydrogenating metals are especially effective. As examples of metal sulphide catalysts that may be used are sulphides or polysulphides of copper, lead, silver, molybdenum, manganese, iron, cobalt, and nickel, or combinations of these. The finely divided metal sulphides may be used as such or they may be supported on suitable inert carriers such as kieselguhr, magnesia, or alumina. Catalysts of the above type are referred to herein as sulphactive hydrogenation catalysts.

The method of preparation of representative sulphactive catalysts is indicated in the foregoing examples but the invention is not limited to these. In general metal sulphides may be formed by precipitation methods or by sulphidation of the metals or their compounds at ordinary or elevated temperatures by means of sulphur, hydrogen sulphide, or other sulphur compounds. The activity of certain of the metal sulphide catalysts may be improved by treatment with hydrogen at elevated temperatures. The partial or complete reduction treatment of the catalyst may take place during the preliminary stages of its use in the processes of this invention.

The process may be carried out in the absence of solvents or in the presence of water or organic solvents, as, for example, ethanol, dioxan, benzene, tetrahydronaphthalene, decahydronaphthalene, etc.

This invention is useful for the preparation of thiophenols which are valuable products having many industrial uses as, for example, in the compounding and vulcanization of rubber. The invention is also useful for eliminating the sulphoacid group from aromatic hydrocarbon derivatives to obtain products free from sulphur.

This invention offers many advantages over older processes for preparing thiophenols. It comprises a novel and effective catalytic hydrogenation process by which certain aromatic sulphoacid derivatives are converted in a single operation into thiophenols. Another advantage is that it offers a means of removing the sulphoacid group from aromatic compounds without at the same time disrupting other parts of the molecule.

It is apparent that many widely different embodiments of this invention may be made without departing from the spirit and scope thereof and therefore it is not intended to be limited except as indicated in the appended claims.

We claim:
1. The process which comprises catalytically hydrogenating aromatic compounds containing an oxygen-sulphur group in which the sulphur atom is directly attached to a carbon atom in the aromatic group.
2. The process which comprises catalytically hydrogenating aromatic compounds containing an oxygen-sulphur group in which the sulphur atom is directly attached to a carbon atom in the aromatic group, said compounds being characterized by being stable against thermal decomposition at the temperature of the hydrogenation reaction.
3. The process in accordance with claim 2 characterized in that said aromatic compound is a salt of an aryl sulphinic acid.
4. The process in accordance with claim 2 characterized in that said aromatic compound is a metal salt of an aryl sulphinic acid.
5. The process in accordance with claim 2 characterized in that said aromatic compound is an alkali metal salt of an aryl sulphinic acid.
6. The process in accordance with claim 2 characterized in that said aromatic compound is an aluminum salt of an aryl sulphinic acid.
7. The process in accordance with claim 2 characterized in that said aromatic compound is an aryl sulphonamide.
8. The process in accordance with claim 2 characterized in that said aromatic compound is an aryl sulphonanilide.
9. The process in accordance with claim 2 characterized in that the reaction is carried out in the presence of a sulphactive hydrogenation catalyst.
10. The process in accordance with claim 2 characterized in that the reaction is carried out in the presence of a catalyst selected from the group consisting of the sulphides of the metals of the iron group of the periodic table.
11. The process in accordance with claim 2 characterized in that the reaction is carried out in the presence of cobalt sulphide.
12. The process in accordance with claim 2 characterized in that the reaction is carried out in the presence of molybdenum sulphide.

WILBUR A. LAZIER.
FRANK K. SIGNAIGO.

CERTIFICATE OF CORRECTION.

Patent No. 2,221,804. November 19, 1940.

WILBUR A. LAZIER, ET AL.

It is hereby certified that error appears in the printed specification of the above numbered patent requiring correction as follows: Page 1, second column, line 14, for "70 g." read --75 g.--; and that the said Letters Patent should be read with this correction therein that the same may conform to the record of the case in the Patent Office.

Signed and sealed this 14th day of January, A. D. 1941.

(Seal)

Henry Van Arsdale,
Acting Commissioner of Patents.